United States Patent Office 3,284,449
Patented Nov. 8, 1966

3,284,449
HYDRAZONES OF 1-AMINO-4-XANTHENECAR-
BONYLPIPERAZINES
John W. Cusic, Skokie, and Peter Yonan, Chicago, Ill.,
assignors to G. D. Searle & Co., Chicago, Ill., a corporation of Delaware
No Drawing. Filed Dec. 29, 1964, Ser. No. 422,057
5 Claims. (Cl. 260—240)

The present invention relates to a group of hydrazones of 1-aminopiperazine wherein the substituent at the 4-position of the piperazine is a xanthenecarbonyl or thioxanthenecarbonyl group or a substituted variant of these groups. More particularly, the present invention relates to a group of compounds having the following general formula

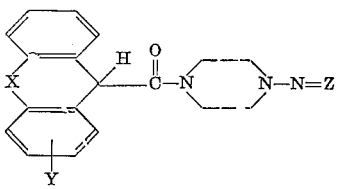

wherein X is selected from the group consisting of O and S; Y is selected from the group consisting of hydrogen, methyl, and halogen; and Z is selected from the group consisting of fluoren-9-ylidene and =CHR wherein R is selected from the group consisting of phenyl, tolyl, halophenyl, methoxyphenyl, methylenedioxyphenyl, hydroxyphenyl, cyanophenyl, and pyridyl.

The halogens referred to above include fluorine, chlorine, bromine, and iodine. Likewise, the halophenyl radicals referred to above include fluorophenyl, chlorophenyl, bromophenyl, and iodophenyl. It should be obvious that when X in the above formula is O, the compounds are xanthenes, and when X is S, the compounds are thioxanthenes.

The compounds of the present invention are conveniently prepared from the reaction of an aldehyde or ketone with an aminopiperazine of the formula

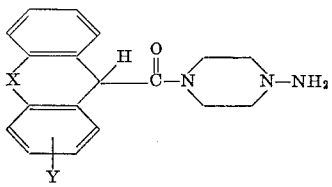

wherein X and Y are defined as above. A trace of acetic acid can be included to catalyze the reaction. Although 2-propanol is a particularly useful solvent for the reaction, ethanol or other alcohols can also be used. In addition, aromatic hydrocarbons such as benzene or toluene are useful as solvents in this type of reaction although, in this case, it is desirable to remove the water from the reaction mixture as it is formed. The reaction is promoted by the use of elevated temperatures.

The intermediate aminopiperazines referred to above are prepared from the corresponding nitroso compound by selective reduction of the nitroso group with a chemical reducing agent such as zinc and acetic acid. The required nitroso compound is prepared from the reaction of 1-nitrosopiperazine with an appropriate acid chloride such as xanthene-9-carbonyl chloride.

The compounds of the present invention are useful because of their pharmacological properties. In particular, the present compounds are useful as anti-ulcer agents. This activity is demonstrated by their inhibition of ulceration in the Shay rat.

The following examples are presented to further illustrate the present invention; they should not be construed as limiting it in spirit or in scope. In these examples, quantities are indicated in parts by weight and temperatures in degrees centigrade (° C.).

EXAMPLE 1

To a suspension of 232 parts of 2-chlorothioxanthene in 1400 parts of ether is added, with stirring, a solution of 70 parts of butyl lithium in heptane. The resultant solution is refluxed for 3 hours and poured into a slurry of Dry Ice and ether. This mixture is allowed to stand for 15 hours and then potassium hydroxide solution is added to dissolve the precipitated carboxylic acid salt. The aqueous layer is separated and acidified with hydrochloric acid. The solid which precipitates is separated and recrystallized from 2-propanol to give 2-chlorothioxanthene-9-carboxylic acid melting at about 225–227° C.

EXAMPLE 2

A suspension of 15 parts of thioxanthene-9-carboxylic acid in 130 parts of dry toluene is heated to reflux and 11.9 parts of thionyl chloride is added. The resultant mixture is refluxed for 2 hours and the solvent and excess thionyl chloride are removed under reduced pressure. Addition of hexane to the residue causes it to crystallize. This solid is thioxanthene-9-carbonyl chloride and it is used without further purification. 2-chlorothioxanthene-9-carboxylic acid is converted to 2-chlorothioxanthene-9-carbonyl chloride in the same manner.

EXAMPLE 3

A solution is prepared from 102 parts of xanthene-9-carbonyl chloride and 750 parts of chloroform; 145 parts of triethylamine is added slowly to this solution. Some heat is generated during the process and the temperature rises to 50° C. A solution of 50 parts of 1-nitrosopiperazine in 150 parts of chloroform is then added portionwise and the mixture is refluxed for 4 hours. It is then cooled and an additional 375 parts of chloroform is added. The resultant solution is washed twice with water and the chloroform solution is dried and concentrated to a small volume by evaporation of the solvent under reduced pressure. Ether is then added to the concentrate and it is cooled. The crystals which form are separated to give 1-nitroso-4-(xanthene-9-carbonyl)piperazine. This compound melts at about 205–207° C. after crystallization from a mixture of chloroform and ether.

In the same manner, thioxanthene-9-carbonyl chloride reacts with 1-nitrosopiperazine to give 1-nitroso-4-(thioxanthene-9-carbonyl)piperazine while the reaction of 1 - nitrosopiperazine with 2 - chlorothioxanthene - 9-carbonyl chloride gives 1-nitroso-4-(2-chlorothioxanthene-9-carbonyl)piperazine.

EXAMPLE 4

A solution of 35 parts of 1-nitroso-4-(xanthene-9-carbonyl)piperazine in 470 parts of glacial acetic acid is heated to about 65° C. with stirring and 82 parts of water is added. Then, 50 parts of zinc dust is added portionwise at 60–65° C. over a period of 30 minutes. The mixture is then stirred at 60–65° C. for an additional 20 minutes before it is filtered. The resultant filtrate is mixed with 500 parts of cold water and made alkaline by the addition of a solution of 320 parts of sodium hydroxide in 1400 parts of water while the mixture is cooled in an ice bath. The mixture is then extracted with 3 portions of chloroform and the combined chloroform extracts are dried and concentrated to a low volume by evaporation of the solvent under reduced pressure. Ether is then added and the resultant solution is cooled to give crystals of 1-amino-4-(xanthene-9-carbonyl) piperazine melting at about 147–150° C. This compound has the following formula

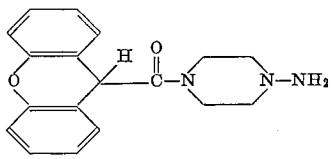

Reduction of 1-nitroso-4-(thioxanthene-9-carbonyl) piperazine and 1-nitroso-4-(2-chloroxanthene-9-carbonyl) piperazine with zinc and acetic acid in the same manner gives, respectively, 1-amino-4-(thioxanthene-9-carbonyl) piperazine and 1 - amino - 4 - (2 - chlorothioxanthene - 9 - carbonyl)piperazine.

EXAMPLE 5

To a solution of 3.5 parts of 1-amino-4-(xanthene-9-carbonyl)piperazine in 25 parts of 2-propanol there is added 2 parts of pyridine-4-carboxaldehyde and 1 drop of glacial acetic acid. The resultant mixture is heated on a steam bath for about 5 minutes and then cooled and stirred to induce crystallization. The solid which precipitates is separated by filtration and recrystallized from a mixture of chloroform and hexane to give 1-(4-pyridylmethyleneamino) - 4 - (xanthene-9-carbonyl) piperazine melting at about 213–214° C. This compound has the following formula

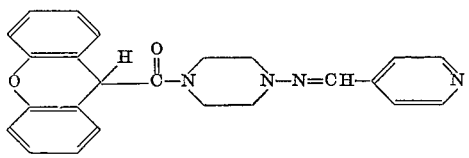

EXAMPLE 6

1-amino-4-(xanthene-9-carbonyl)piperazine is reacted with benzaldehyde according to the procedure described in Example 5. In this case, the product is 1-benzylideneamino-4-(xanthene-9 - carbonyl)piperazine melting at about 146–147° C. after recrystallization from a mixture of chloroform and hexane.

In the same manner, benzaldehyde is reacted with 1-amino - 4 - (thioxanthene - 9 - carbonyl)piperazine and 1-amino-4-(2-chlorothioxanthene-9 - carbonyl)piperazine to give, respectively, 1 - benzylideneamino - 4 - (thioxanthene-9-carbonyl)piperazine and 1-benzylideneamino-4-(2-chlorothioxanthene-9-carbonyl)piperazine.

EXAMPLE 7

Fluorenone is reacted with 1-amino-4-(xanthene-9-carbonyl)piperazine according to the procedure described in Example 5. In this case, the crude product is recrystallized from 2-propanol to give 1-(fluoren-9-ylideneamino)-4-(xanthene-9 - carbonyl)piperazine melting at about 193–194° C. This compound has the following formula

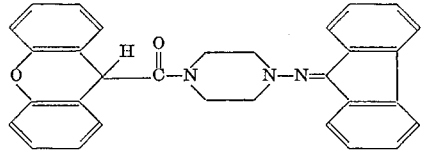

EXAMPLE 8

An equivalent quantity of piperonal is substituted for the pyridine-4-carboxyaldehyde and the procedure of Example 5 is repeated. The crude product is recrystallized from a mixture of chloroform and hexane to give 1 - piperonylideneamino - 4 - (xanthene - 9 - carbonyl) piperazine melting at about 194–195° C.

In the same manner, 1-amino-4-(xanthene-9-carbonyl) piperazine is reacted with 4-tolualdehyde, 4-chlorobenzaldehyde, 4 - fluorobenzaldehyde, 4 - bromobenzaldehyde, 3-methoxybenzaldehyde, and 4-hydroxybenzaldehyde to give the corresponding benzylidene derivatives in each instance.

What is claimed is:
1. A compound of the formula

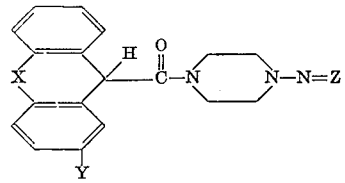

wherein X is selected from the group consisting of O and S; Y is selected from the group consisting of hydrogen and chlorine; and Z is selected from the group consisting of fluoren-9-ylidene and =CHR wherein R is selected from the group consisting of phenyl, tolyl, halophenyl, hydroxyphenyl, methoxyphenyl, methylenedioxyphenyl, and pyridyl.

2. 1 - benzylideneamino - 4 - (xanthene - 9 - carbonyl) piperazine.

3. 1-piperonylideneamino - 4 - (xanthene - 9-carbonyl) piperazine.

4. 1 - (fluoren - 9 - ylideneamino) - 4 - (xanthene - 9-carbonyl)piperazine.

5. 1-amino-4-(xanthene-9-carbonyl)piperazine.

No references cited.

ALEX MAZEL, *Primary Examiner.*

JAMES W. ADAMS, JR., *Assistant Examiner.*